United States Patent
Seto

Patent Number: 5,936,637
Date of Patent: *Aug. 10, 1999

[54] IMAGE PROCESSING SYSTEM HAVING OUTLINE FONT DATA INPUT

[75] Inventor: Kunio Seto, Inagi, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/332,052

[22] Filed: Nov. 1, 1994

Related U.S. Application Data

[63] Continuation of application No. 08/044,080, Apr. 6, 1993, abandoned, which is a continuation of application No. 07/711,519, Jun. 4, 1991, abandoned, which is a continuation of application No. 07/571,847, Aug. 24, 1990, abandoned, which is a continuation of application No. 07/158,760, Feb. 22, 1988, abandoned.

[30] Foreign Application Priority Data

Feb. 27, 1987 [JP] Japan .................................. 62-44942

[51] Int. Cl.⁶ .............................. G06T 11/60; G09G 5/24
[52] U.S. Cl. ........................ 345/468; 345/144; 345/947; 345/470
[58] Field of Search ................................. 395/150, 151, 395/141, 139; 345/141, 143, 144, 194, 195, 472, 471, 467, 468, 470, 947, 441, 439, 128–130

[56] References Cited

U.S. PATENT DOCUMENTS

| | | | |
|---|---|---|---|
| 4,078,249 | 3/1978 | Lelke et al. | 395/116 |
| 4,231,096 | 10/1980 | Hansen et al. | 345/441 |
| 4,298,945 | 11/1981 | Kyte et al. | 345/144 X |
| 4,342,096 | 7/1982 | McDevitt | 395/110 |
| 4,675,830 | 6/1987 | Hawkins | 345/144 X |
| 4,745,561 | 5/1988 | Hirosawa et al. | 345/471 |
| 4,748,443 | 5/1988 | Uehara et al. | 345/144 X |
| 4,785,391 | 11/1988 | Apley et al. | 345/144 X |
| 4,817,172 | 3/1989 | Cho | 345/144 X |
| 4,837,847 | 6/1989 | Shirasaka et al. | 382/256 |
| 4,907,282 | 3/1990 | Daly et al. | 345/471 X |

*Primary Examiner*—Raymond J. Bayerl
*Attorney, Agent, or Firm*—Fitzpatrick Cella Harper & Scinto

[57] ABSTRACT

An image processing system has bit map figure data of a plurality of sizes and edits a document on the basis of this data. This system comprises an input device to input a figure by a polygon definition, an instructing circuit to instruct the input figure with a desired size, and an output device to output the figure with the desired size in response to the input instruction. The figure data of standard sizes are stored as bit map data into a memory even when auxiliary characters are registered. When inputting figure data of a size larger than the standard sizes, it is stored as polygon definition data. Thus, the memory capacity can be reduced and the labors and time to define an auxiliary character can be reduced.

15 Claims, 7 Drawing Sheets

IMAGE PROCESSING SYSTEM HAVING OUTLINE FONT DATA INPUT

This application is a continuation of application Ser. No. 08/044,080 filed Apr. 6, 1993, now abandoned, which is a continuation of application Ser. No. 07/711,519, filed Jun. 4, 1991, abandoned, which is a continuation of application Ser. No. 07/571,847 filed Aug. 24, 1990, abandoned, which is a continuation of application Ser. No. 07/158,760 filed Feb. 22, 1988, abandoned.

BACKGROUND OF THE INVENTION

1. Field of the Invention

The present invention relates to a system for processing images by a bit map memory and, more particularly, to an image processing system which has character/figure data in a plurality of bit map sizes and is intended to edit and output a document of high quality. In this invention, the image process generally denotes the whole edition of sentences which are mainly constituted by character typesetting, figures, drawings, or the like.

2. Related Background Art

Hitherto, when a document is edited using a bit map memory, in order to improve the variety and quality in document edition, there is considered a method whereby character/figure data based on a plurality of bit map sizes such as 24 dots, 32 dots, and the like are previously stored, a proper bit map size is selected in accordance with the output size designated by the edition, and this data is displayed and output with this selected size.

In this case, when an arbitrary character or figure (in general, this is referred to as an auxiliary character) which is not preliminarily prepared is displayed or output, auxiliary character bit map data is generally individually defined with respect to the plurality of bit map sizes mentioned above and registered.

However, in the foregoing conventional system the auxiliary character bit map data must be individually defined with regard to a plurality of bit map sizes which can be processed by the system (it is necessary to prepare at least a plurality of kinds of display and output sizes which will be probably processed during the document edition).

On the other hand, the defining efficiency of the bit map data is inherently low. Further, it takes a very large amount of work and time to repeat the defining processes.

SUMMARY OF THE INVENTION

In consideration of the foregoing points, it is an object of the present invention to provide an image processing system comprising figure input means by the polygon definition, code adding means for storage and access of a relevant figure, and output means for outputting the figure with the designated size, wherein the individual definition based on a plurality of bit map sizes in the conventional system can be omitted, and the labors and time for auxiliary character definition can be remarkably reduced.

Another object of the invention is to provide an image processing system in which by defining one auxiliary character, the auxiliary characters can be also defined to all kinds of output sizes which the system has.

Still another object of the invention is to transfer bit map figure data or polygon definition figure data to the area to be output on the basis of the input readout code, and to output a proportionally balanced figure with the size in accordance with the bit map figure data.

Still another object of the invention is to provide an image processing system in which the input figure data is stored as bit map figure data according to the ordinary character size and, further, with respect to a large size, the figure data is stored by the polygon definition.

Still another object of the invention is to provide a system in which even in the case of registering auxiliary characters, the data of the standard size which is frequently used is stored as bit map data and the high output speed is significantly considered, and for the data of a large size, it is stored as the polygon definition data, so that the memory capacity can be reduced and both of the high output speed and the small memory capacity can be realized.

BRIEF DESCRIPTION OF THE DRAWINGS

FIGS. 1–2 is a system block diagram for explaining the operation of the invention;

DETAILED DESCRIPTION OF THE PREFERRED EMBODIMENT

The present invention will be described in detail hereinbelow with reference to the drawings.

Figure 1:
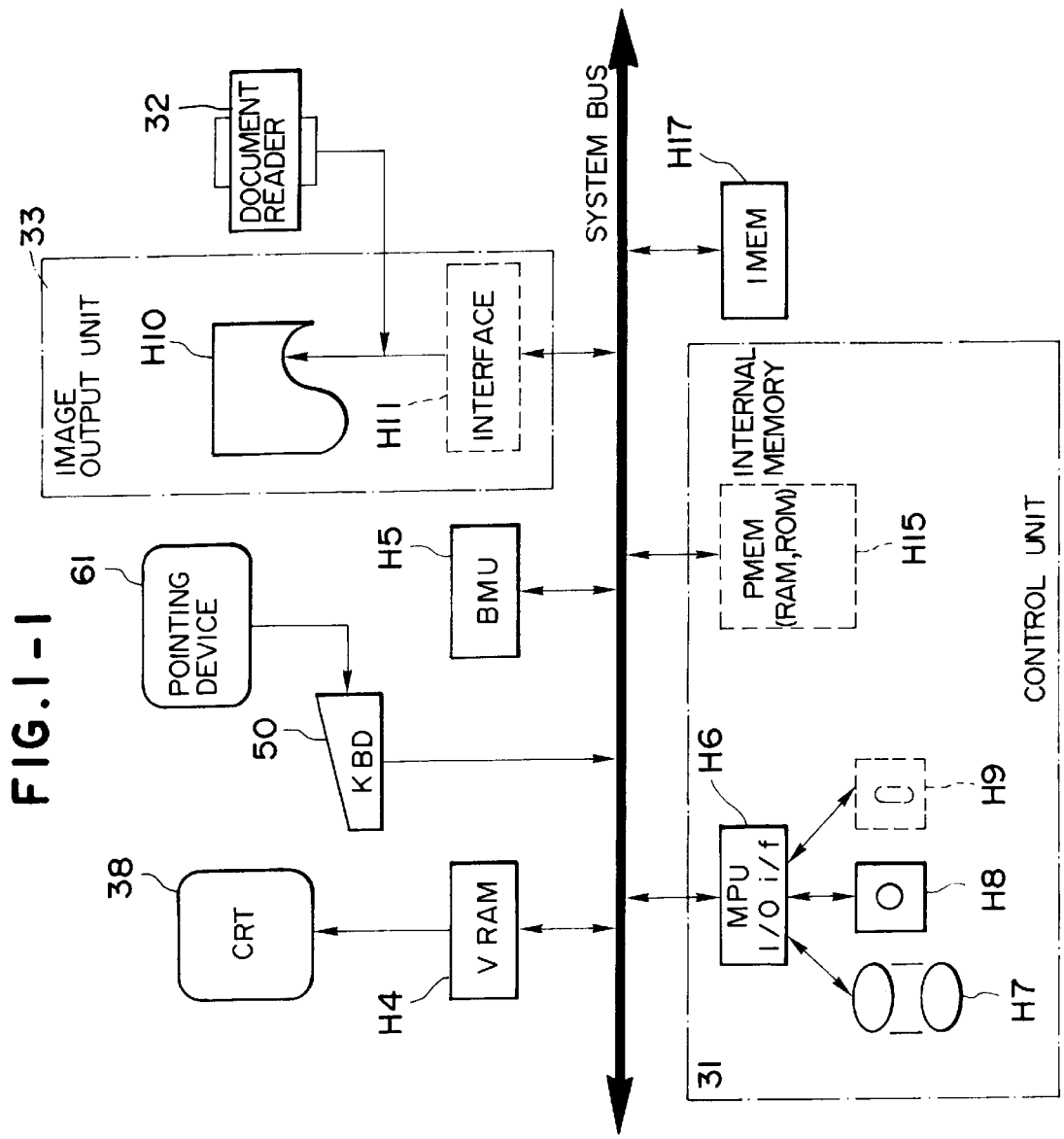
FIGS. 1—1 is a block diagram of a system to which the present invention is applied.

FIGS. 1—1 is a block diagram of a system to which the invention is applied. The invention is not limited to only this system but can be also applied to a sole system or a system a part of which is modified.

Reference numeral 31 denotes a control unit of the system. The control unit 31 comprises: microcomputer $H_6$, an internal memory $H_{15}$ consisting of RAM, ROM, or the like; and an external memory consisting of a hard disk $H_7$, a floppy disk $H_8$, a cartridge disk $H_9$, or the like.

Numeral 32 denotes a document reader serving as an image input unit. Image data of a document put on an original base plate is converted into electric signals by an image pickup device such as a CCD or the like.

Numeral 33 denotes a high speed printer $H_{10}$ such as a laser beam printer or the like serving as an image output unit for recording an image onto a recording material on the basis of the image information in the form of the electric signals.

Numeral 38 denotes a CRT device serving as an image processing display unit of the invention. Control information or the like of the system is displayed by the CRT device 38.

Numeral 50 denotes a keyboard provided for the control unit 31. By operating the keyboard 50, the operation of the system is instructed or the like.

Numeral 61 denotes a pointing device to instruct the processing of image information on the CRT 38. A cursor on the CRT 38 is moved arbitrarily in the X and Y directions, thereby selecting and indicating a desired command image on the command menu displayed.

$H_4$ denotes a VRAM. Data to be displayed on the CRT 38 is developed in a bit map. For example, in the case of the character data, the character image information corresponding to the code of this character data is developed in the VRAM.

$H_{15}$ denotes a program memory (PMEM). A program for editing process is properly selected from the hard disk $H_7$ and executed. The data which was input and arithmetically operated by this system can be developed in an image memory IMEM ($H_{17}$) and is output by the image output unit 33.

$H_5$ denotes a bit manipulation unit (BMU) which can perform the DMA transfer in which data can be transferred among the VRAM $H_4$, the PMEM $H_{15}$, and the IMEM $H_{17}$ without passing through the CPU. Upon data transfer, the BMU $H_5$ has functions to perform logical arithmetic operations on a bit unit basis and to execute the rotation, enlargement/reduction of a variable magnification, or the like of a developed figure.

The embodiment of the invention will be described hereinbelow with reference to the drawings.

Figures 1, 2:
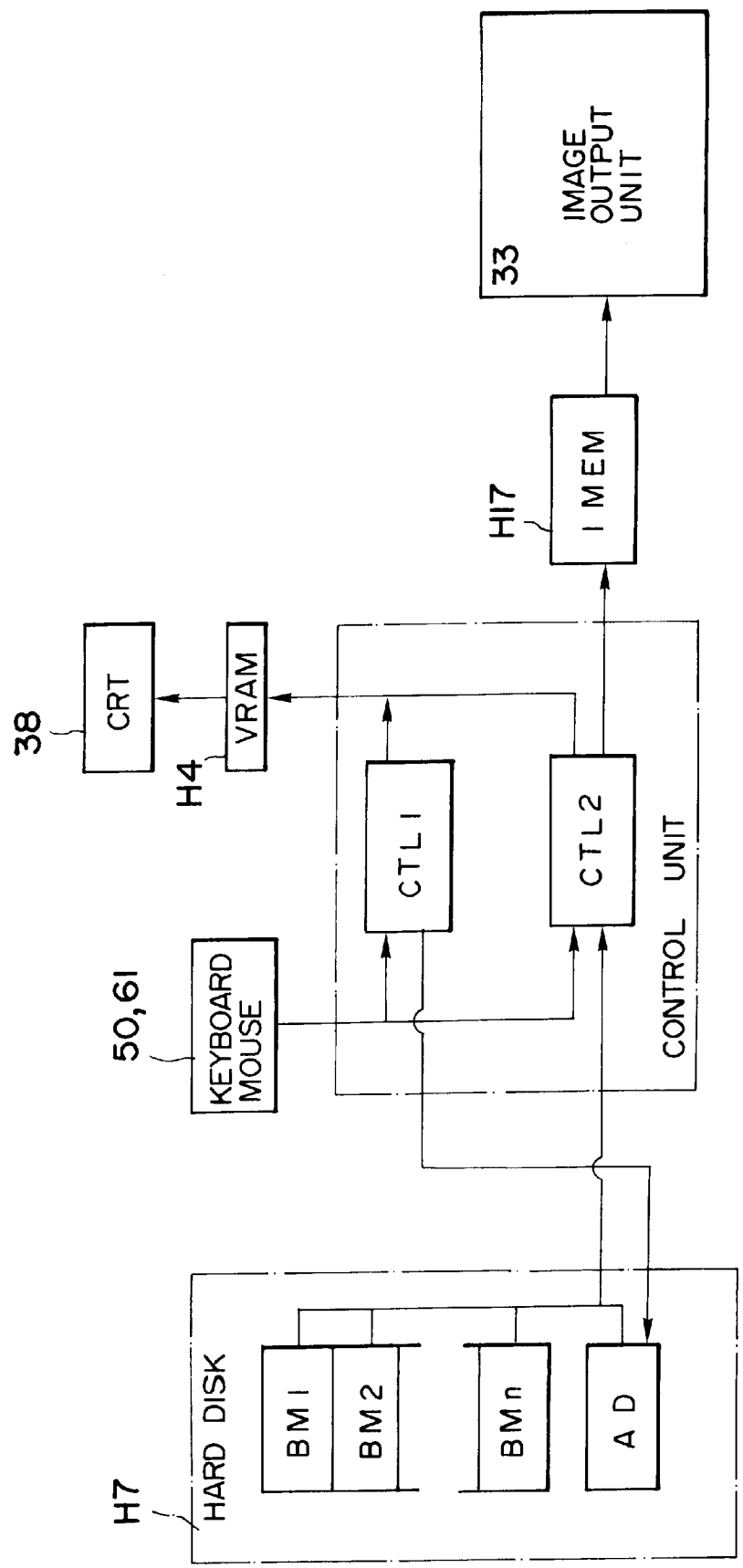

FIGS. 1–2 is a diagram for explaining the operation of the invention in the system with the above constitution. In the diagram, the same components as those in FIGS. 1—1 are designated by the same reference numerals.

$BM_1$, $BM_2$, . . . , $BM_n$ denote standard character/figure data storage areas based on a plurality of bit map sizes stored in the hard disk $H_7$. For example, a bit map character/figure set of 24×24 dots is prepared. In a manner similar to the above, character/figure sets of 44×44 dots, 88×88 dots, and the like are each have a bit map prepared. In this embodiment, these storage are provided in the hard disk $H_7$ as an external storage device. However, the data may be also stored into an ROM.

$CTL_1$ denotes a program which is properly loaded into the PMEM $H_{15}$ of the internal memory, as a control unit of the figure input means by the polygon definition in the invention. The program (control unit) controls the code input (since it is necessary to distinguish a code from the access code of the bit map character/figure when it is output, the code which is not overlapped with the access code is input) for the storage and access by the input device such as the keyboard 50, mouse 61, or the like, of the designated coordinates input for the polygon definition. It also controls the output to the display unit, i.e., CRT 38 through the VRAM $H_4$, in order to inform the result of this definition to the user, the temporary storage of each definition figure data, and the storage into a storage area AD provided in the hard disk H (sometimes referred to as format information).

Figure 4:
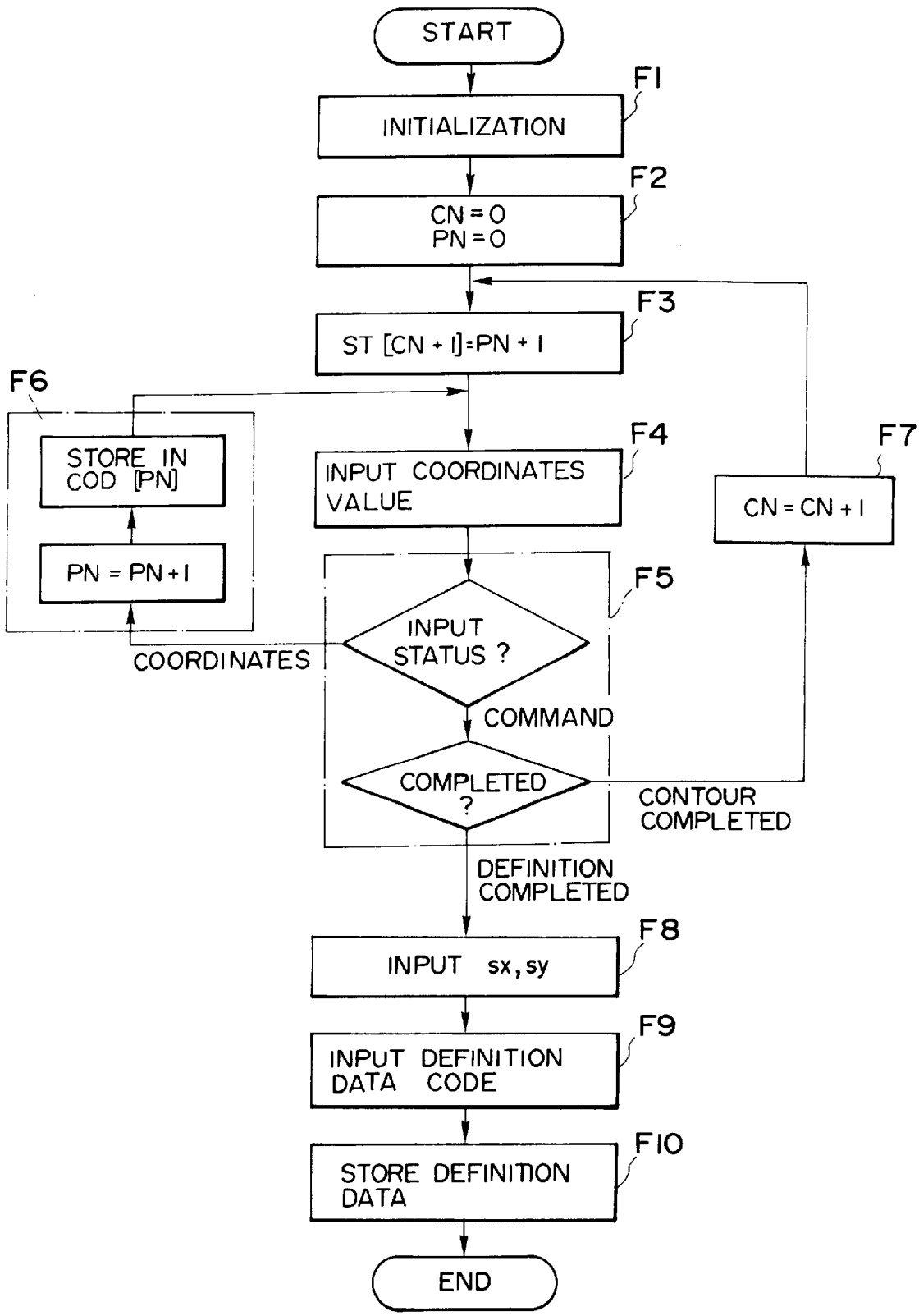
FIG. 4 is a flowchart to make the foregoing data by the polygon definition.

FIG. 4 shows a flowchart of the program for the $CTL_1$ to make the foregoing data (an explanation will be made hereinlater).

FIG. 2 shows the storage format in the storage area of the polygon definition figure data stored in the hard disk $H_7$ and its content. Index 1 to Index n in FIG. 2A denote index sections to record the offsets from the head of the actual polygon definition figure information storage areas corresponding to the codes for storage and access, which will be explained hereinafter, and the data lengths. Data 1 to Data n denote data sections to store the actual polygon definition figure information.

Figure 2A:
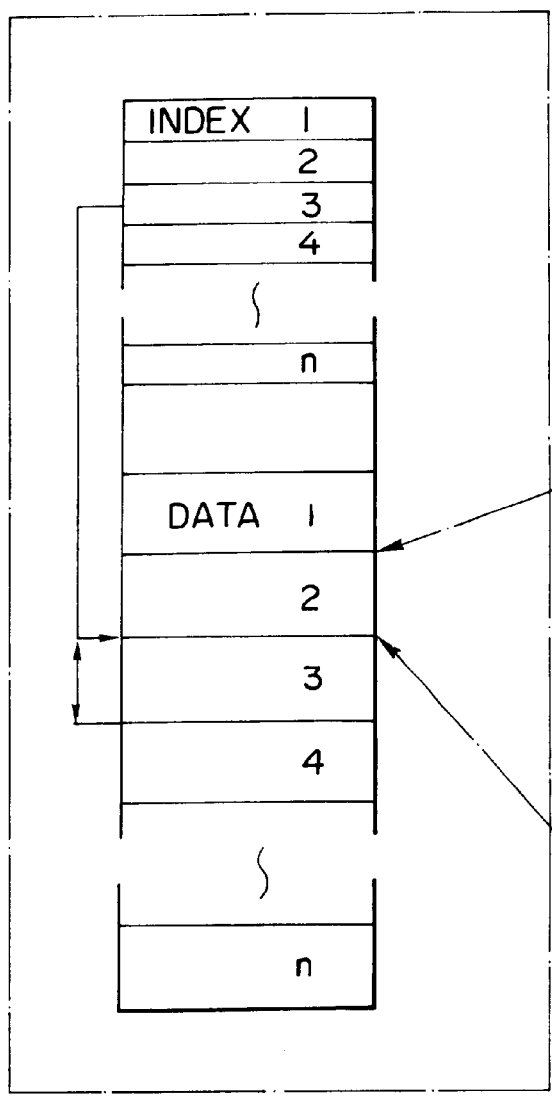
FIGS. 2A and 2B are diagrams showing a storage format in a storage area of polygon definition figure data and its content.
Figure 2B:
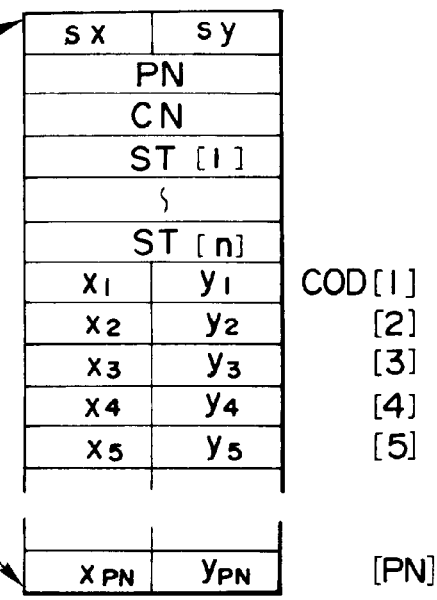

FIG. 2B is a diagram showing the content of the actual polygon definition figure information. This information has the same format as that in the coordinate value storage area which is controlled by the program $CTL_1$ in FIGS. 1–2.

PN denotes the total number of coordinate points of a polygon which is defined; CN indicates the number of polygons in one figure which is defined. Each of ST[1] to ST[n] denotes a pointer array indicative of the position of the array into which the start coordinates of each polygon in the input coordinate value array, which will be explained hereinbelow, are stored. Each of COD[1] to COD[PN] represents a vertex coordinate value array of a polygon having the x and y coordinate values. On the other hand, ($s_x$, $s_y$) which are added to the head denote the recording (x, y) coordinate values of the size which is used as fundamental data in coordinate conversion when reducing or enlarging to the designated output size with a variable magnification in the case of actually outputting the defined polygon figure data.

Figures 3A, 3B:
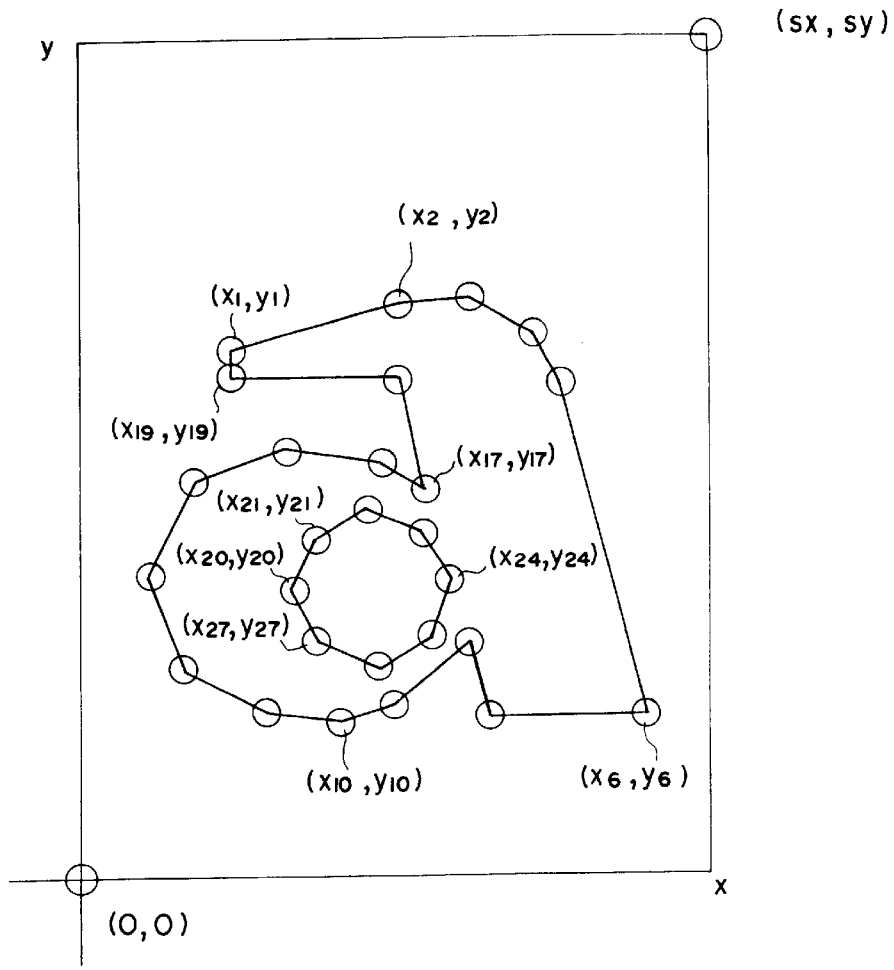
FIGS. 3A and 3B are explanatory diagrams of a definition polygon.

FIGS. 3A and 3B show explanatory diagrams in the case where the foregoing content is applied to an actual definition polygon. FIG. 3B shows the actual values of the stored data in accordance with FIG. 2B in the case where the foregoing polygon is defined.

FIG. 5 shows a flow of a program (processing unit) $CTL_2$ in FIGS. 1–2 to access the data which had been polygon defined by the foregoing processes and was stored into the storage area in the disk or the like and to display or output this data with the designated size. (The flow of the program $CTL_2$ will be explained hereinlater.)

FIG. 4 shows a flow for the program of the foregoing $CTL_1$ to form the above-mentioned data by the polygon definition. In the initialization in step f1, the internal work area having the same format as that of the data in FIG. 2B is held. In step f2, the contents of CN (the number of polygons) and PN (the total number of coordinate points) are initialized. In step f3, the contour start point offset on each vertex coordinate array COD[1] to COD[PN] is recorded in the pointer array ST[1] to ST[CN]. In step f4, the values designated on the display screen of the CRT 38 by the pointing device 61 are transferred to a coordinate value register. However, in this case, the coordinate input area and a command area are previously defined. By discriminating any of these areas, the input status in step f5 is decided. In step f5, if the input status indicates the coordinate area, the content of the coordinate value register is stored into the COD array in step f6. If the status is a command and indicates the end of contour in step f5, the content of CN is increased by "1" in step f7. Then, the processing routine is returned to step f3.

On the other hand, if the definition has been completed, the definition sizes $s_x$ and $s_y$ in step f8 are input. These values are used as reference data to calculate the enlargement/reduction rate upon outputting in the $CTL_2$, which will be explained hereinlater. In step f9, the definition data code (access code) is input from the keyboard 50. On the basis of this value, the position of the Index in FIG. 2A is decided. The offset of the data area and the data length (size) in FIG. 2B are written. Thereafter, in step f10, the definition data is stored into the disk $H_7$ or the like in the format in FIG. 2B of the foregoing internal work area information.

Figure 5A:
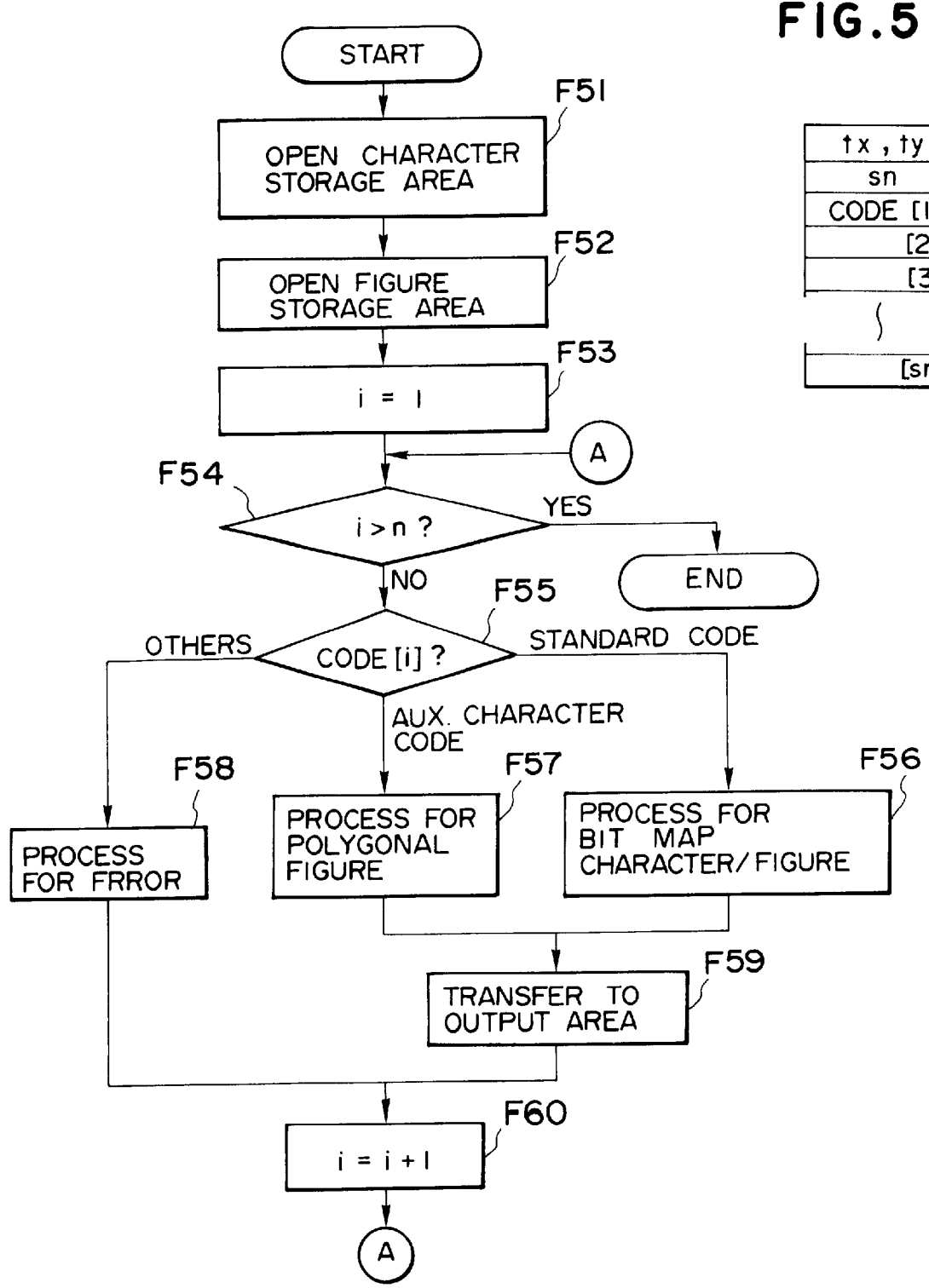
FIGS. 5A and 5B are explanatory diagrams to access the polygon defined data and to output it in accordance with the designated size.
Figure 5B:
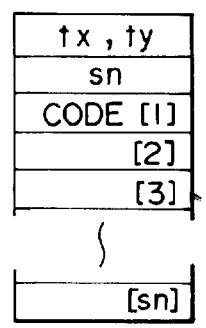

Next, FIG. 5 shows a flow for the $CTL_2$ in FIGS. 1–2 of the processing unit to access the data which had been polygon defined and was stored into the storage area in the disk or the like by the foregoing processes and to display or output the data with the designated size. Even when a character or figure is directly designated by the keyboard 50 or pointing device 61, or even when the designated data is stored and held as access code in, e.g., an external disk or the like, a temporary storage buffer of the output code shown in FIG. 5B is similarly provided in the internal storage area, and the output processing unit executes the outputting process in accordance with the content of the temporary storage buffer. In steps f51 and f52, the storage areas are opened on the basis of the designated output size ($T_x$, $T_y$) and output size ($S_x$, $S_y$). In the next steps f53, f54, f55, and f60, the sequential readout control of the output code temporary storage buffer (FIG. 5B) is executed. In step f56, the ordinary bit map character/figure outputting process is executed. If the designated data is the external code, in step f57, the coordinates of the polygon defined figure mentioned above are converted into the same size as that of the standard characters (bit map characters/figures which have been prepared) which are used in the actual document edition (in general, the sizes in the height direction are uniformed). The inside of the figure is painted out or the like. Thereafter, the image data is transferred into the designated output area in the memory. On the other hand, when outputting, the process to paint out the inside of the figure can be also omitted to increase the real time property when data is displayed. In the foregoing coordinate conversion, the multiplication is repeated for the coordinate values shown in FIG. 2B on the basis of the following equation.

$$\text{rate} = t_y / s_y$$

$$\{X_i = x_i * \text{rate},$$

$$Y_i = y_i * \text{rate}\} i = 1 \text{ to CN}$$

where, $t_y$ is a designated output size, $s_y$ is a definition polygon size (both of them denote the height direction of a character/figure), $x_i$ and $y_i$ are definition coordinate values, $X_i$ and $Y_i$ represent coordinate values which were converted into the output size, and CN indicates the total number of vertex coordinates of the polygon.

The error process in step f58 is executed in the case where the stored code in FIG. 5B is neither the ordinary bit map character/figure code or the auxiliary character polygon figure code (namely, the relevant code does not exist). In general, the process to form the output area as a blank or the like is executed.

The image processing system in the invention may be a unitary system or a system which is constituted by a plurality of apparatuses. Further, it may be a control unit having programs provided in those apparatuses.

As described in detail above, according to the invention, by inputting one figure by the polygon definition and by reflecting to all sizes, the individual definition by a plurality of bit map sizes can be omitted and the labors and time can be remarkably reduced.

In the present invention, the figure which was input by the polygon definition is output in accordance with the ordinary character size. However, even in the case of characters which were input as auxiliary characters, it is also possible to constitute in a manner such that the characters of the ordinary character sizes are converted into the dot data and stored and the characters of sizes larger than a predetermined size are stored by the polygon definition.

An explanation will now be made with respect to an example in which a polygon definition figure which was input by the polygon definition is converted into dots for every bit map size in the case of the ordinary size (32×32, 44×44, 56×56 dots) and a character figure set is formed, and the figure data obtained by the polygon definition is used in the case of the larger size (64×64 dots).

FIG. 6 is a flowchart for the above processes. After completion of the processing program for the polygon definition shown in FIG. 4 (step S1), characters of the bit map sizes of 32×32, 44×44, and 56×56 dots of the standard (normal) sizes which are frequently used are respectively formed (polygon definition→dots) and stored into the foregoing hard disk (step S2).

The foregoing sizes (32×32, 44×44, 56×56 dots) correspond to 6 Pt, 8 Pt, and 10 Pt at 400 dpi (dots/inch). The size of 64×64 dots likewise corresponds to 12 Pt at 400 dpi.

The case of outputting will now be explained with reference to FIG. 6B. First, the bit map character storage area is opened on the basis of the designated output size ($T_x$, $T_y$) in accordance with the type style data or the like (step f51).

Figure 6A:
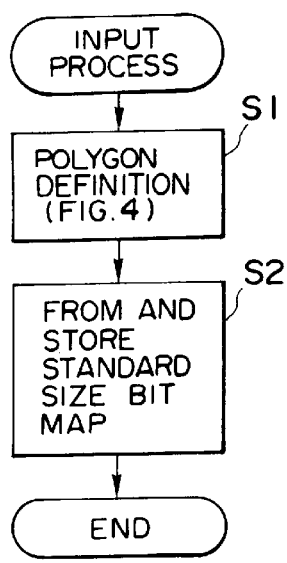
FIGS. 6A and 6B are diagrams showing another embodiment.

There is also a case where with respect to the character obtained by defining the auxiliary character data formed in FIG. 6A by the bit map, its area is also obviously opened in dependence on the size. In step f52, the polygon figure storage area is opened. A parameter i is set in step f53. In step f54, a check is made to see if the processes have been finished or not until the code array n shown is FIG. 5B. The type of code in discriminated by the code array code [i] in FIG. 5B in step f55. If the input code is the standard code, step f56 follows and the bit map character/figure is developed. On the other hand, if the input code is the auxiliary character code, a check is made in step f61 to see if the designated output size ($T_x$, $T_y$) is larger than the standard size (32×32, 44×44, 56×56 dots) or not. If it is larger than the standard size, step f57 follows and a polygon figure is developed. If the designated output size is determined to be the standard size in step f61, step f62 follows. In step f62, the bit map figure is developed in order to develop the auxiliary character from the bit map area corresponding to the designated output size which had been formed in step S2 in FIG. 6A and was opened in step f51 in FIG. 6B. By transferring the data obtained in steps f56, f57, and f62 to the output area in step f59, a desired character can be output. If the input code is none of the standard size code and the auxiliary character code, the processing routine advances from step f55 to step f58, thereby performing the error process.

What is claimed is:

1. A figure processing apparatus comprising:

input means for inputting at least one coordinate value indicative of an outline of a figure designated on a display;

discrimination means for discriminating whether coordinate values for a given outline have been input by said input means;

control means for controlling said input means to input at least one coordinate value for a next outline if said discrimination means discriminates that coordinate values for the given outline have been input, and controlling said input means to input a next coordinate value for the given outline if said discrimination means discriminates that coordinate values for the given outline have not been input; and memory control means for controlling a memory to store the coordinate values input by said input means in correspondence to code information, wherein the memory comprises a data memory area for storing the coordinate values input by said input means and an index memory area for storing index information used for retrieval of the stored coordinate value that corresponds to code information to be input.

2. An apparatus according to claim 1, wherein the figure includes a character.

3. An apparatus according to claim 1, wherein at least one coordinate value is designated with a pointing device.

4. An apparatus according to claim 1, further comprising additional input means for inputting the code information.

5. An apparatus according to claim 1, further comprising additional discrimination means for discriminating whether coordinate values for outlines of one figure have been input by said input means, wherein said memory control means controls the memory to store the coordinate values input by said input means in correspondence to code information if said additional discrimination means discriminates that coordinate values for outlines of one figure have been input by said input means.

6. A figure processing method using a memory comprising a data memory area for storing coordinate values and an index memory area for storing index information, comprising the steps of:

inputting at least one coordinate value indicative of an outline of a figure designated on a display;

discriminating whether coordinate values for a given outline have been input in said inputting step;

controlling said inputting step to input at least one coordinate value for a next outline if said discriminating step discriminates that coordinate values for the given outline have been input, and controlling said inputting step to input a next coordinate value for the given outline if said discriminating step discriminates that coordinate values for the given outline have not been input; and controlling the memory to store the coordinate values input in said inputting step in correspondence to code information in the data memory area, wherein the index information stored in the index memory area of the memory is used for retrieval of the stored coordinate value that corresponds to code information to be input.

7. A method according to claim 6, wherein the figure includes a character.

8. A method according to claim 6, further comprising the step of designating the at least one coordinate value with a pointing device.

9. A method according to claim 6, further comprising the step of inputting the code information.

10. A method according to claim 6, further comprising a second step of discriminating whether coordinate values for outlines of one figure have been input in said inputting step, wherein said memory controlling step controls the memory to store the coordinate values input in said inputting step in correspondence to code information if said second discriminating step discriminates that coordinate values for outlines of one figure have been input in said inputting step.

11. A memory medium upon which is stored a computer program for performing figure processing using a memory including a data memory area for storing coordinate values and an index memory area for storing index information, the computer program comprising the steps of:

inputting at least one coordinate value indicative of an outline of a figure designated on a display;

discriminating whether coordinate values for a given outline have been input in said inputting step;

controlling said inputting step to input at least one coordinate value for a next outline if said discriminating step discriminates that coordinate values for the given outline have been input, and controlling said inputting step to input a next coordinate value for the given outline if said discriminating step discriminates that coordinate values for the given outline have not been input; and controlling the memory to store the coordinate values input in said inputting step in correspondence to code information in the data memory area, wherein the index information stored in the index memory area of the memory is used for retrieval of the stored coordinate value that corresponds to code information to be input.

12. A memory medium according to claim 11, wherein the figure includes a character.

13. A memory medium according to claim 11, wherein the program further comprises the step of designating the at least one coordinate value with a pointing device.

14. A memory medium according to claim 11, wherein the program further comprises the step of inputting the code information.

15. A memory medium according to claim 11, wherein the program further comprises a second step of discriminating whether coordinate values for outlines of one figure have been input in said inputting step, and wherein said memory controlling step controls the memory to store the coordinate values input in said inputting step in correspondence to code information if said second discriminating step discriminates that coordinate values for outlines of one figure have been input in said inputting step.

* * * * *

UNITED STATES PATENT AND TRADEMARK OFFICE
CERTIFICATE OF CORRECTION

PATENT NO. : 5,936,637

DATED : August 10, 1999

INVENTOR(S) : KUNIO SETO

It is certified that error appears in the above-identified patent and that said Letters Patent is hereby corrected as shown below:

IN THE DRAWINGS:

SHEET 6, Fig. 5A, "PROCESS FOR FRROR" should read --PROCESS FOR ERROR--.

SHEET 7, Fig. 6A, "FROM" should read --FORM--.

Figure 6B:
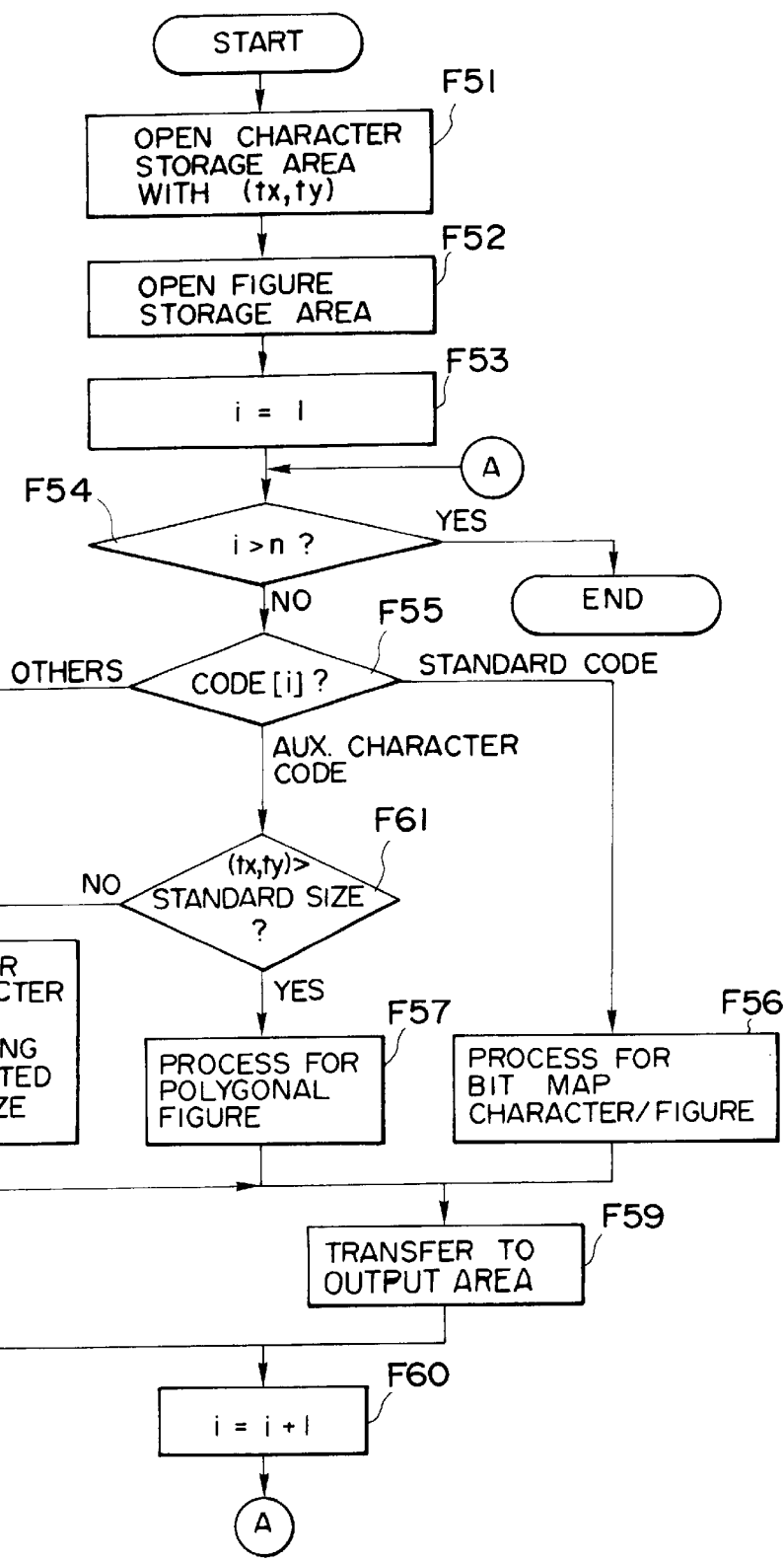

SHEET 7, Fig. 6B, "PROCESS FOR FRROR" should read --PROCESS FOR ERROR-- and "CONESPONDING" (in F62) should read --CORRESPONDING--.

COLUMN 2

Line 16, "FIGS. 1-1" should read --FIG. 1-1 --.
    Line 18, "FIGS. 1-2" should read --FIG. 1-2 --.
    Line 39, "FIGS. 1-1" should read --FIG. 1-1 --.

UNITED STATES PATENT AND TRADEMARK OFFICE
CERTIFICATE OF CORRECTION

PATENT NO. : 5,936,637

DATED : August 10, 1999

INVENTOR(S) : KUNIO SETO

It is certified that error appears in the above-identified patent and that said Letters Patent is hereby corrected as shown below:

COLUMN 3:

Line 22, "FIGS. 1-2" should read --FIG. 1-2 --.
    Line 31, "are" should be deleted.
    Line 32, "are" should read --areas are--.
    Line 49, "H" should read --$H_7$--.
    Line 53, "FIG. 2 shows" should read
--FIGS. 2A and 2B show--.
    Line 65, "FIGS. 1-2" should read --FIG. 1-2 --.

COLUMN 4:

Line 20, "FIGS. 1-2" should read --FIG. 1-2 --.
    Line 56, "FIGS. 1-2" should read --FIG. 1-2 --.

Signed and Sealed this

Seventh Day of March, 2000

Attest:

Attesting Officer

Q. TODD DICKINSON

Commissioner of Patents and Trademarks